United States Patent
Park et al.

(10) Patent No.: US 10,620,755 B2
(45) Date of Patent: Apr. 14, 2020

(54) TOUCH PANEL INCLUDING BENT WIRE IN FLEXIBLE AREA AND DISPLAY PANEL INCLUDING THE TOUCH PANEL

(71) Applicant: Samsung Display Co., Ltd., Yongin-si (KR)

(72) Inventors: Sungkyun Park, Yongin-si (KR); Hyunjae Na, Yongin-si (KR); Gwangbum Ko, Yongin-si (KR); Kyungseop Kim, Yongin-si (KR); Cheolkyu Kim, Yongin-si (KR); Kihyun Cho, Yongin-si (KR); Sangyoun Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 227 days.

(21) Appl. No.: 15/001,988

(22) Filed: Jan. 20, 2016

(65) Prior Publication Data
US 2016/0306462 A1   Oct. 20, 2016

(30) Foreign Application Priority Data
Apr. 14, 2015   (KR) .......................... 10-2015-0052527

(51) Int. Cl.
*G06F 3/044*   (2006.01)
(52) U.S. Cl.
CPC .... *G06F 3/044* (2013.01); *G06F 2203/04102* (2013.01); *G06F 2203/04103* (2013.01); *G06F 2203/04111* (2013.01); *G06F 2203/04112* (2013.01)

(58) Field of Classification Search
None
See application file for complete search history.

(56) References Cited

U.S. PATENT DOCUMENTS

| | | | |
|---|---|---|---|
| 2011/0227858 A1* | 9/2011 | An | G06F 3/044 345/174 |
| 2014/0028584 A1* | 1/2014 | Park | G06F 3/041 345/173 |
| 2014/0217373 A1 | 8/2014 | Youn et al. | |
| 2014/0217397 A1 | 8/2014 | Kwak et al. | |
| 2014/0232956 A1 | 8/2014 | Kwon et al. | |
| 2014/0340593 A1* | 11/2014 | Sato | G02F 1/13338 349/12 |
| 2014/0361786 A1* | 12/2014 | Yao | G06F 3/041 324/537 |
| 2015/0070309 A1* | 3/2015 | Kang | G06F 3/044 345/174 |

(Continued)

FOREIGN PATENT DOCUMENTS

| | | |
|---|---|---|
| KR | 1020140099139 | 8/2014 |
| KR | 1020140099164 | 8/2014 |
| KR | 1020140103025 | 8/2014 |

*Primary Examiner* — Amr A Awad
*Assistant Examiner* — Donna V Lui
(74) *Attorney, Agent, or Firm* — H.C. Park & Associates, PLC

(57) ABSTRACT

A touch panel including: a base substrate including a flexible area; a touch sensing part disposed on the base substrate; and a wiring part disposed on the base substrate. The wiring part includes a bent portion that is bent at least once in a direction that is not parallel to a top surface of the base substrate in the flexible area.

19 Claims, 13 Drawing Sheets

(56) References Cited

U.S. PATENT DOCUMENTS

| | | | |
|---|---|---|---|
| 2015/0241924 A1* | 8/2015 | Chang | G06F 3/044 349/12 |
| 2016/0035812 A1* | 2/2016 | Kwon | H01L 27/3276 257/40 |
| 2016/0179229 A1* | 6/2016 | Ahn | G06F 3/041 345/173 |
| 2016/0188098 A1* | 6/2016 | Her | G06F 3/0416 345/173 |
| 2016/0327841 A1* | 11/2016 | Jia | G02F 1/1345 |

* cited by examiner

TOUCH PANEL INCLUDING BENT WIRE IN FLEXIBLE AREA AND DISPLAY PANEL INCLUDING THE TOUCH PANEL

CROSS-REFERENCE TO RELATED APPLICATION

This application claims priority from and the benefit of Korean Patent Application No. 10-2015-0052527, filed on Apr. 14, 2015, which is hereby incorporated by reference for all purposes as if fully set forth herein.

BACKGROUND

Field

Exemplary embodiments relate to a touch panel and a display device having the same. More particularly, exemplary embodiments relate to a foldable touch panel and a display device having the same.

Discussion of the Background

Generally, a touch panel for a touch screen display refers to a panel that is disposed on an upper side of a display device that is configured to be directly contacted by a hand or an object or configured to sense a touch thereof on a window disposed on the touch panel, allowing a human hand or an object to select instructions displayed on a screen of a display device. The display device having a touch panel recognizes a location of a contact made on the touch panel (or a window disposed on the touch panel) and may be driven according to an input signal, determining what is instructed at the location of the contact as an input signal.

Since a display device having a touch panel may not require an additional input device that operates while being coupled to the display device, such as a keyboard and/or a mouse, the use of the touch panel has been widely adopted.

In recent years, touch panels have been used in display devices. In this case, touch panels are provided on upper sides of display panels which display images. The touch panels are configured to receive some input from users and detect location information.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch panel and a display device having the same with improved durability.

Additional aspects will be set forth in the detailed description which follows, and, in part, will be apparent from the disclosure, or may be learned by practice of the inventive concept.

An exemplary embodiment discloses a touch panel including: a base substrate including a flexible area; a touch sensing part disposed on the base substrate, the touch sensing part configured to detect a touch input; and a wiring part disposed on the base substrate. The wiring part is configured to connect the touch sensing part to a driver circuit. The wiring part includes a bent wire that is bent at least once in a direction that is not parallel to a top surface of the base substrate in the flexible area.

An exemplary embodiment also discloses a display device including: a display panel; and a touch panel disposed on a front surface of the display panel. The touch panel includes: a base substrate including a flexible area; a touch sensing part disposed on the base substrate, the touch sensing part configured to detect a touch input; and a wiring part disposed on the base substrate, the wiring part configured to connect the touch sensing part to a driver circuit. The wiring part includes a bent wire that is bent at least once in a direction not parallel to a top surface of the base substrate in the flexible area.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
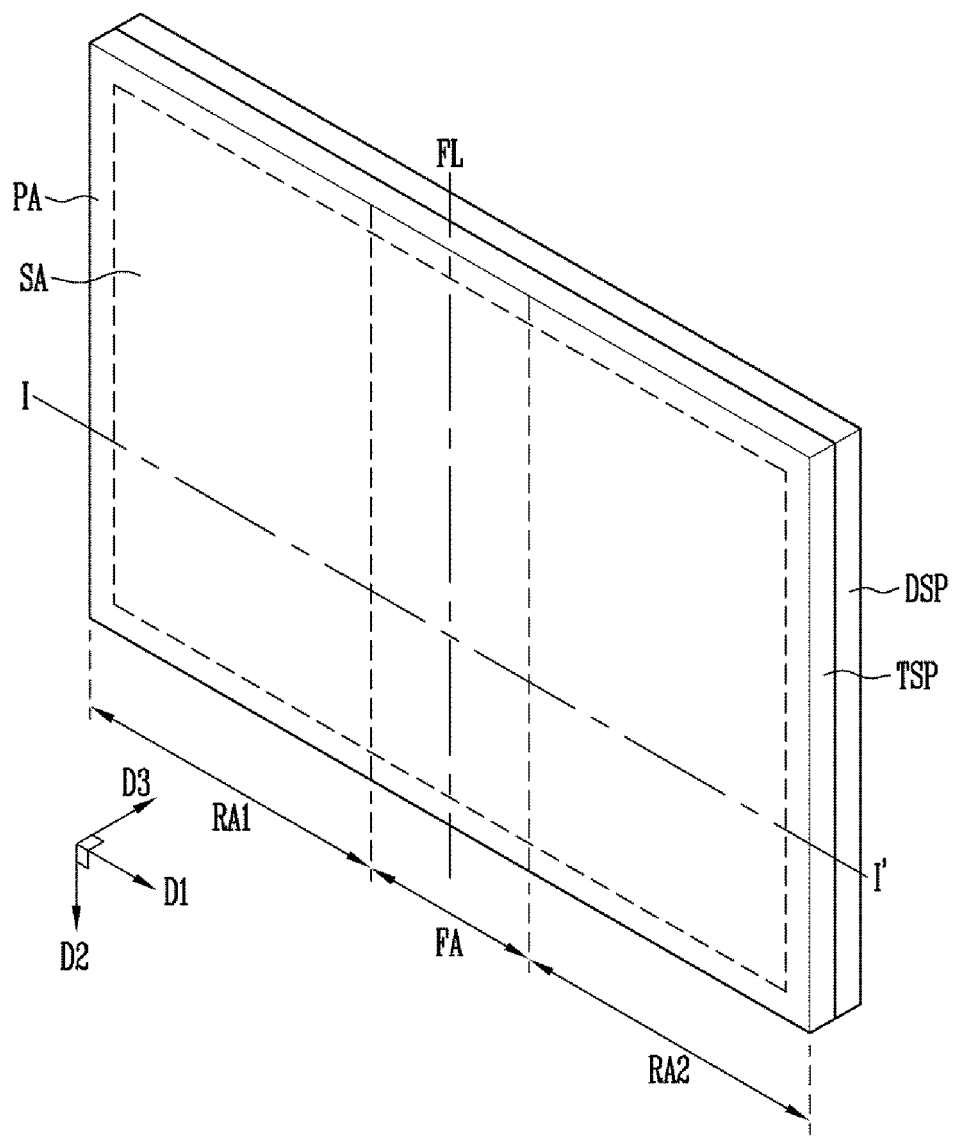
FIG. 1 is a perspective view illustrating a display device having a touch panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

An exemplary embodiment discloses a touch panel which is a device that senses a touch event made through a user's hand, a stylus or other input tools and displays or transfers information in response to the touch event. The touch panel may be used in various devices, particularly in display devices, carrying out its role in sensing touch events made by users.

In an exemplary embodiment, the touch panel is described as being used in a display device.

Figure 2A:
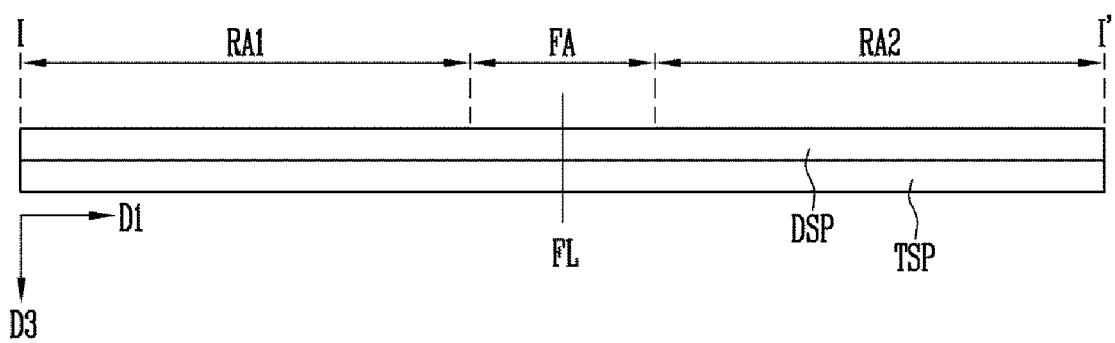
FIG. 2A is a cross sectional view taken along section line I-I' in FIG. 1 according to an exemplary embodiment.
Figure 2B:
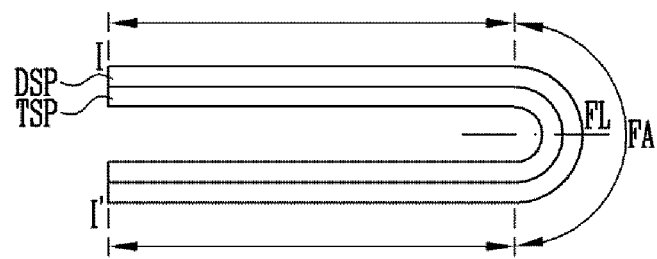
FIG. 2B is a cross sectional view illustrating the display device in FIG. 1 in a folded state according to an exemplary embodiment.

FIG. 1 is a perspective view illustrating a display device having a touch panel according to an exemplary embodiment. FIG. 2A is a cross sectional view taken along section line I-I' in FIG. 1 according to an exemplary embodiment. FIG. 2B is a cross sectional view illustrating the display device in FIG. 1 in a folded state according to an exemplary embodiment.

Referring to FIG. 1, FIG. 2A, and FIG. 2B, a display device may be provided in various forms. For example, but without limitation thereto, the display device may be configured as a rectangular plate having two pairs of parallel sides. If the display device is configured in a rectangular plate, one pair of the two pairs of sides may be longer than the other pair of sides. In an exemplary embodiment illustrated in FIG. 1, the display device is shown in a rectangular shape having a pair of long sides and a pair of short sides, and a first direction D1 refers to a direction parallel to the extension direction of the long sides, a second direction D2 refers to a direction parallel to the extension direction of the short sides, and a third direction D3 refers to a direction that is perpendicular to the extension directions of the long sides and short sides, as illustrated in FIG. 1.

At least a portion of the display device may be flexible. The display device may be folded if the corresponding location is configured as a flexible part. More specifically, the display device may have a foldable area at which the display device has flexibility and may be folded and a rigid area that is provided at least at a side of the foldable area and at which the display device has no flexibility. In an exemplary embodiment, the rigid area may not be provided, and the entire display device may be configured as a foldable area. For example, but without limitation, if there is a display device that can be rolled like a roll, such display device may be considered as having the entire display device as the foldable area.

According to an exemplary embodiment, in the first direction D1, the first rigid area RA1, the foldable area FA, and the second rigid area RA2 are sequentially disposed. The foldable area FA may extend along the second direction D2.

If a line over which the display device is folded is called as a folding line FL, the folding line may be provided in a plural. At least one of the folding lines may be provided in the foldable area FA. According to an exemplary embodiment, the folding line FL is illustrated as passing the center of the foldable area FA such that the display device is symmetric with respect to the folding line FL. However, it should not be limited thereto. The folding line FL may be formed in the foldable area FA such that the display device is asymmetric with respect to the folding line FL. The foldable area FA and the folding line of the foldable area FA may overlap in an area in which an image of the display panel DSP is displayed. If the display device is folded, a portion that displays the image may be folded.

A term of "folded" does not necessarily mean a general folded state of a thing and not limited to a fixed form; rather, it may include a state in which a certain form may change into another form. For example, "folded" may refer to being folded, curved, or rolled along at least one certain line, that is, the folding line FL. In an exemplary embodiment, one surface of each of the two rigid areas are configured as parallel and folded to face each other is illustrated (see e.g., FIG. 2B). However, it should not be limited thereto. Surfaces of the two rigid areas may be folded while forming a preset angle (for example, an acute angle, a vertical angle or an obtuse angle), with the foldable area interposed therebetween, which will be described below.

Also, if the foldable area FA and the rigid areas RA1 and RA2 are described as "having flexibility" or "not having flexibility", and the terms "soft" or "rigid" are expressions relatively showing properties of the display device. More specifically, the expressions "not having flexibility" and "rigid" refer to not only those instances where a material does not have flexibility at all and thus is hard, but also to those instances where a material has flexibility that is less than that of the foldable area FA. Accordingly, the rigid areas RA1 and RA2 may have relatively small flexibility compared to the foldable area FA or may not have any flexibility. Even upon a condition that the foldable area FA is folded, the rigid areas RA1 and RA2 may not be folded.

The folding line FL may be provided in the foldable area FA along the second direction which is the extension direction of the foldable area FA. Accordingly, the display device may be folded at the foldable area FA.

In an exemplary embodiment, for illustration convenience, the first and second rigid areas RA1 and RA2 may have a similar area, and although it is illustrated that the foldable area FA is located between the two rigid areas, it should not be limited thereto. For example, the first and second rigid areas RA1 and RA2 may have different areas. Also, the rigid areas do not have to be two rigid areas but they may be one rigid area or three or more rigid areas. A plurality of rigid areas may be spaced apart from each other, with the foldable areas FA interposed between two or more rigid areas.

The display device may include a display panel DSP and a touch panel TSP.

The display panel DSP may display visual information, for example, but without limitation thereto, text, video, pictures, 2-dimensional or 3-dimensional images, and the like. Hereinafter, the visual information may be displayed as "image". The display panel DSP may, for example, but without limitation thereto, include organic light emitting diode display panel, liquid crystal display panel, electrophoretic display panel, electrowetting display panel, and the like.

The touch panel TSP may be disposed on a front surface of the display panel DSP, that is, on a surface where an image is displayed. The touch panel TSP may be provided with the display panel DSP in the display panel in a single body. In an exemplary embodiment, the touch panel TSP provided on a top surface of the display panel DSP is described as an example.

Each of a display panel DSP and a touch panel TSP in the display device may have a foldable area and a rigid area. The foldable area of the display panel DSP may correspond to the foldable area of the touch panel TSP. The rigid area of the display panel DSP may correspond to the rigid area of the touch panel TSP. However, the sizes of the foldable areas in the display panel DSP and the touch panel TSP may be substantially the same or slightly different from each other.

The display panel DSP may include a display area on which the image is displayed and a non-display area located on at least one side of the display area. For example, but without limitation thereto, the non-display area may be provided in a form in which the non-display area surrounds the display area.

The touch panel TSP may generate a touch event of a user. The touch panel TSP may include a sensing area SA sensing the touch event and a peripheral area PA located on at least one side of the sensing area SA. For example, but without limitation thereto, the peripheral area PA may be provided in a form in which the peripheral area PA surrounds the sensing area SA.

In an exemplary embodiment, the display area (not shown) and the sensing area (SA) of the display panel DSP may correspond to each other and may overlap when viewed from a plane view. The non-display area (not shown) and the peripheral area PA of the display panel DSP may correspond to each other and may overlap when viewed from a plane view.

Figure 3:
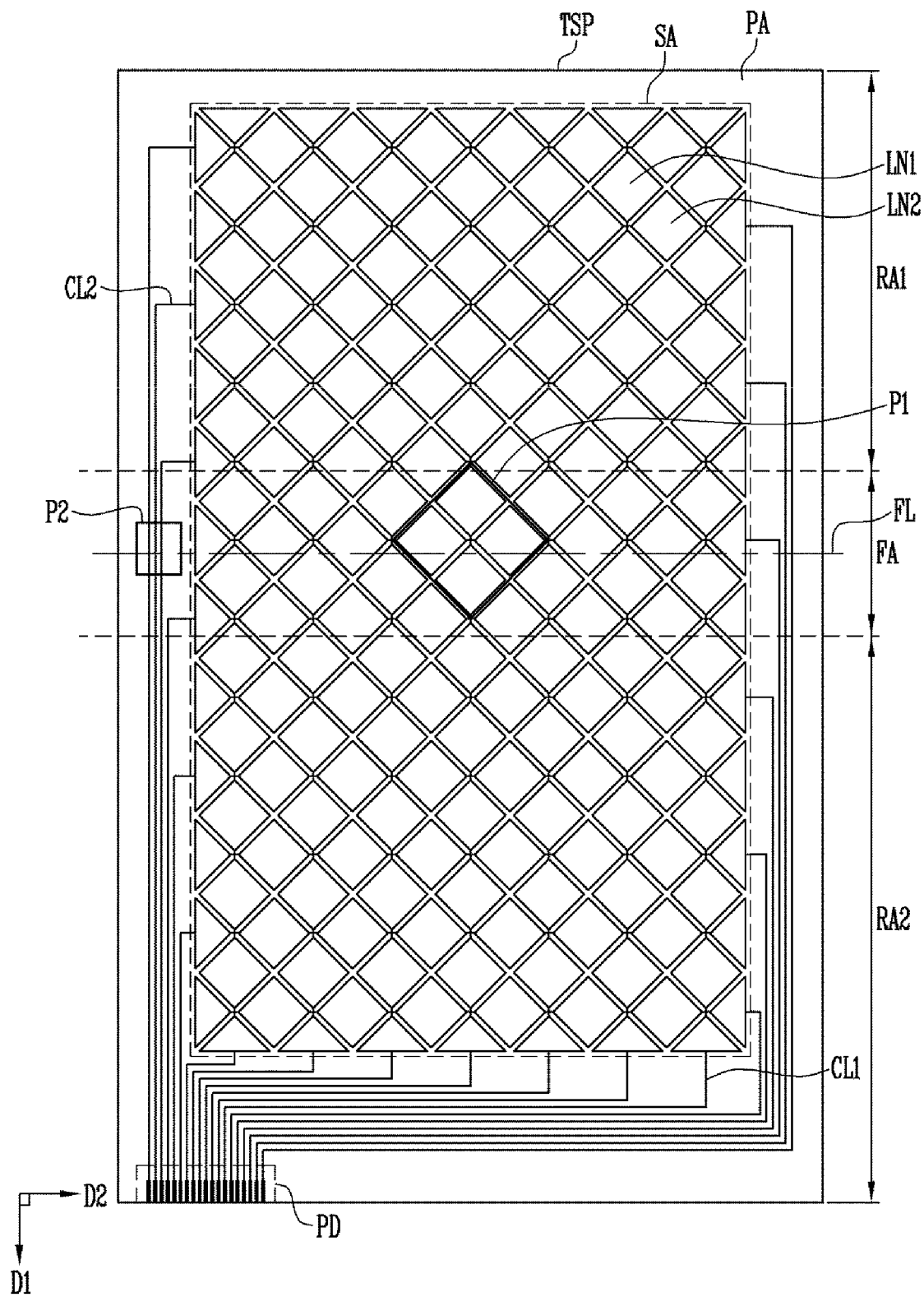
FIG. 3 is a plane view illustrating a touch panel according to an exemplary embodiment.
Figure 4A:
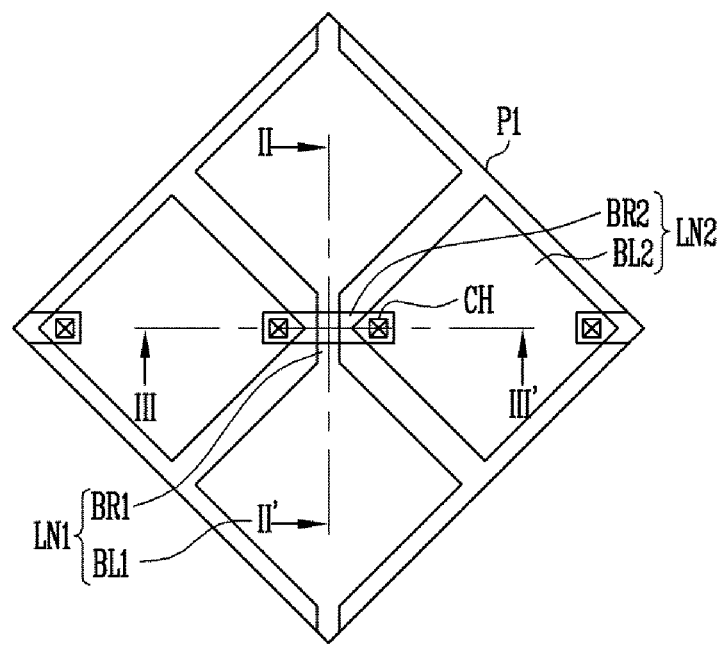
FIG. 4A is a plane view showing an enlarged view of area P1 illustrated in FIG. 3 according to an exemplary embodiment.
Figure 4B:
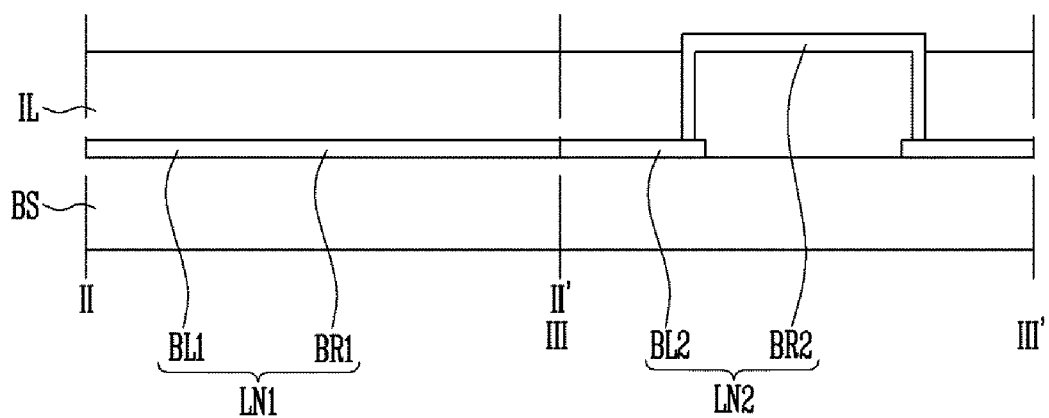
FIG. 4B is a cross sectional view taken along section lines II-II' and III-III' in FIG. 4A according to an exemplary embodiment.
Figure 5A:
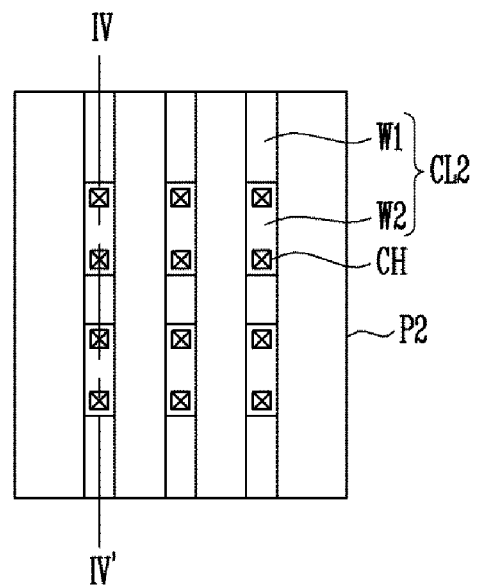
FIG. 5A is a plane view showing an enlarged view of area P2 illustrated in FIG. 3 according to an exemplary embodiment.
Figure 5B:
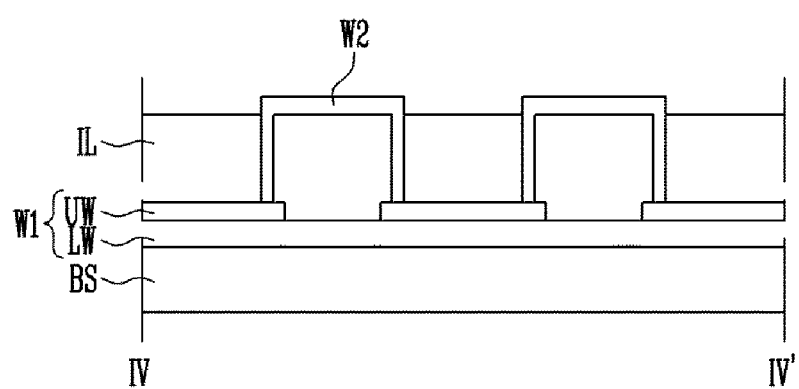
FIG. 5B is a cross sectional view taken along section line IV-IV' in FIG. 5A according to an exemplary embodiment.

FIG. 3 is a plane view illustrating a touch panel TSP according to an exemplary embodiment. FIG. 4A is a plane view showing an enlarged view of area P1 illustrated in FIG. 3 according to an exemplary embodiment. FIG. 4B is a cross sectional view taken along section lines II-II' and III-III' in FIG. 4A according to an exemplary embodiment. FIG. 5A is a plane view showing an enlarged view of P2 illustrated in FIG. 3 according to an exemplary embodiment. FIG. 5B is a cross sectional view taken along section line IV-IV' in FIG. 5A according to an exemplary embodiment.

Referring to FIG. 3, the touch panel TSP may include a touch sensing part disposed in a sensing area SA and a wiring part disposed in a peripheral area PA.

The touch sensing part may recognize a touch event occurring in the display device through a human hand or other input tools. In an exemplary embodiment, the touch sensing part may be provided in a capacitive type, a resistive type or other touch sensing types.

Referring to FIG. 3, FIG. 4A, and FIG. 4B, the touch sensing part may extend in a first direction D1 and may include a plurality of first sensing lines LN1 to which sensing voltage is applied and a plurality of second sensing lines LN2 extending in a direction different from the first direction D1, for example, but without limitation thereto, a second direction D2 perpendicular to the first direction D1. The first sensing lines LN1 may form a capacitance coupling with the second sensing lines LN2, and the voltage may change due to the capacitance coupling.

Each of the first sensing lines LN1 may include a plurality of first blocks BL1 arranged in the first direction D1 and a plurality of first bridges BR1 coupling the first blocks BL1 that are adjacent to each other. The first blocks BL1 may be provided in polygons including a quadrangle which includes various shapes, for example, but without limitation thereto, stick shape, rhombus shape, and the like. Each of the second sensing lines LN2 may include a plurality of second blocks BL2 arranged in the second direction D2 and a plurality of second bridges BR2 coupling the second blocks BL2 that are adjacent to each other. The second blocks BL2 may also be provided in polygons including a quadrangle which includes various shapes, for example, but without limitation thereto, stick shape, rhombus shape, and the like. The first blocks BL1 and the second blocks BL2 may alternate each other and may be arranged as a matrix form on the first base substrate BS1.

The first blocks BL1 forming each of the first sensing lines LN1 and the first bridges BR1 may be formed as a single body that is not divided. Or, the second blocks BL2 forming each of the second sensing lines LN2 and the second bridges BR2 may be formed as a single body that is not divided. In an exemplary embodiment shown in FIG. 4A, each of the first sensing lines LN1 being formed as a single body that is not divided is illustrated. For each of the second sensing lines LN2, the second bridges BR2 may be formed on a different layer from the second blocks BL2. The first blocks BL1, the first bridges BR1 and the second blocks BL2 may be disposed on the base substrate BS. An insulating layer IL may be disposed on the first blocks BL1, the first bridges BR1, and the second blocks BL2. The insulating layer IL may include silicon nitride or silicon oxide. The insulating layer IL may include contact holes CH partially exposing the second blocks BL2. The second bridges BR2 may couple the second blocks BL2 that are adjacent to each other through the contact holes CH.

Referring to FIG. 4B, a touch panel according to an exemplary embodiment is described below.

The first block BL1, the first bridge BR1, and the second block BL2 may be disposed on a base substrate BS.

The base substrate BS may be generally a quadrangle and may be formed of a transparent insulating material.

The first block BL1, the first bridge BR1 and the second block BL2 may include or may be formed of a transparent conductive material. The transparent conductive material may include at least one of silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube, and graphene. The first block BL1, the first bridge BR1, and the second block BL2 may include or may be formed of a single layer or multi-layers, and may include multi-layers with two or more stacked materials from e.g., the materials above.

An insulating layer IL may be disposed on the base substrate BS at which the first block BL1, the first bridge BR1, and the second block BL2 are formed.

The insulating layer IL may be an organic insulating layer or an inorganic insulating layer. As for a material of the organic insulating layer, an organic insulating material such as a polyacrylic compound, a polyimide compound, a fluorinated carbon compound such as Teflon® and a benzocyclobutene compound may be used. As for a material of the inorganic insulating layer, an inorganic insulating material such as polysiloxane, silicon nitride, and silicon oxide may be used.

Contact holes CH which exposes part of the second block BL2 may be disposed on the insulating layer IL.

The second bridge BR2 may be disposed on the insulating layer IL. The second bridge BR2 may contact the second blocks BL2 through the contact holes CH and may electrically couple the second blocks BL2 that are adjacent to each other.

The second bridge BR2 may include or may be formed of a metal. For example, but without limitation thereto, the second bridge BR2 may include or may be made of at least one of metals such as gold (Au), silver (Ag), aluminum (Al), molybdenum (Mo), chrome (Cr), titanium (Ti), nickel (Ni), neodymium (Nd), copper (Cu), or an alloy of the metals. The second bridge BR2 may be formed of a single layer, but it is not limited thereto, and the second bridge BR2 may be formed of the metals and may have multi-layers with at least two stacked materials from the alloys.

Referring to FIG. 3, FIG. 5A, and FIG. 5B, the wiring part may be disposed in the peripheral area PA and may be coupled to the touch sensing part.

The wiring part may couple the touch sensing part to a driver circuit (not shown) that drives the touch panel TSP. The driver circuit may be provided externally and may include a position detection circuit. The wiring part may transfer sensing input signal from the driver circuit to the first sensing lines LN1 and the second sensing lines LN2, or, may transfer sensing output signal from the first sensing lines LN1 and the second sensing lines LN2 to the driver circuit.

The wiring part may include a plurality of first connection lines CL1, a plurality of second connection lines CL2, and a pad portion PD.

Ends of the first connection lines CL1 may be coupled to the first sensing lines LN1 and the other ends of the first connection lines CL1 may be coupled to the pad portion PD. The first connection lines CL1 may bend multiple times in the peripheral area PA when viewed from a plane view.

The second connection lines CL2 may include a first wire W1 and a second wire W2. Ends of the second connection lines CL2 may be coupled to the second sensing lines LN2 and the other ends may be coupled to the pad portion PD.

The second connection lines CL2 may, when viewed from a plane view, bend multiple times in the peripheral area PA.

The pad portion PD may be for coupling the first connection lines CL1 and the second connection lines CL2 and may be disposed on a side of the peripheral area PA. The first connection lines CL1 and the second connection lines CL2 may be coupled to the driver circuit using a connector or a non-conductive adhesive film and the like provided to the pad portion PD.

Referring to FIG. 5B, a second connection line CL2 in the foldable area of the wiring part of the touch panel according to an exemplary embodiment is described below.

A first wire W1 may be disposed on the base substrate BS.

The first wire W1 may include a lower wire LW and an upper wire UW which are sequentially stacked on the base substrate BS.

The lower wire LW may include or may be formed of a transparent conductive material. The lower wire LW may be formed of the same material as the first block BL1, the first bridge BR1, and the second block BL2 (see e.g., FIGS. 4A and 4B). The transparent conductive material may include at least one of silver nano wire (AgNW), indium tin oxide (ITO), indium zinc oxide (IZO), antimony zinc oxide (AZO), indium tin zinc oxide (ITZO), zinc oxide (ZnO) and tin oxide $SnO_2$, carbon nano tube and grapheme. The lower wire may include or may be formed of a single layer or multi-layers, and may include multi-layers with two or more stacked materials from the above materials.

The upper wire UW may be formed to overlap the lower wire LW when viewed from a plane view. The upper wire UW may completely overlap the lower wire LW in the rigid area when viewed from a plane view. The upper wire UW may partially overlap the lower wire LW in the foldable area when viewed from a plane view, and a part of the upper wire UW may be removed.

The upper wire UW may include or may be formed of metal. For example, but without limitation thereto, the upper wire UW may include or may be made of at least one of metals such as gold (Au), silver (Ag), aluminum (Al), molybdenum (Mo), chrome (Cr), titanium (Ti), nickel (Ni), neodymium (Nd), copper (Cu), or an alloy of the metals. The upper wire UW may be formed of a single layer, but it is not limited thereto. The upper wire UW may include or may be formed of the metals and multi-layers with at least two stacked materials from the alloys.

The insulating layer IL may be disposed on the base substrate BS where the first wire W1 is formed.

The contact holes CH which exposes part of the first wire W1 may be disposed on the insulating layer IL.

The second wire W2 may be disposed on the insulating layer IL. The second wire W2 may contact the first wire W1 through the contact holes CH and may electrically be coupled to the first wire W1. The second wire W2 may be arranged corresponding to a portion from which the upper wire UW of the first wire W1 is removed.

The second wire W2 may include or may be formed of metal. For example, but without limitation thereto, the second wire W2 may include or may be made of at least one of metals such as gold (Au), silver (Ag), aluminum (Al), molybdenum (Mo), chrome (Cr), titanium (Ti), nickel (Ni), neodymium (Nd), copper (Cu), or an alloy of the metals. The second wire W2 may include or may be formed of a single layer, but it is not limited thereto, and the second wire W2 may include or may be formed of the metals and have multi-layers with at least two stacked materials from the alloys.

The second wire W2 may use the same metal as the upper wire UW of the first wire W1, but it may also be provided with a different metal. For example, if the upper wire UW of the first wire W1 is made of copper, the second wire W2 may be formed of copper as well. Or, if the upper wire UW of the first wire W1 is made of copper, the second wire W2 may be formed of another metal different from copper, for example, but without limitation thereto, of aluminum.

In the touch panel having the above structure, sensing input signal from the driver circuit may be transferred through the wiring part, and as a result, an electric charge may be accumulated to the touch sensing part. If a contact is made on the touch panel by a user, capacitance formed by the first sensing lines LN1 and the second sensing lines LN2 may vary, sensing signal according to the capacitance may be output, the sensing signal may be transferred through the wiring part, the sensing signal may be analyzed by the driver circuit, and the position of the contact made may be identified.

As described above, the second connection line CL2 may have a structure in the rigid area that is different from the structure in the foldable area. The second connection line CL2 may extend in a direction (first direction or second direction) parallel to the top surface along the top surface of the base substrate in the rigid area. However, a part of the second connection line CL2 may have, in the foldable area, a bending portion formed by having an angle (the angle being neither 0 degree nor 180 degrees) with respect to the top surface of the base substrate BS. More specifically, a part of the second connection line CL2 may have a bending portion that bends at least once in a vertical direction (i.e., a third direction) in the foldable area. The upper wire UW of the first wire W1 and the second wire W2 of the second connection line CL2 may be formed of metal, and the portion made of the metal may be disposed in a shape in which it bends multiple times in a direction perpendicular to the top surface of the base substrate BS.

Since the second connection line CL2, as described above, bends at least once in a direction that is not parallel to the top surface of the base substrate in the foldable area, stress that is concentrated on a portion at which it bends is dispersed when the touch panel is folded.

Figure 6A:
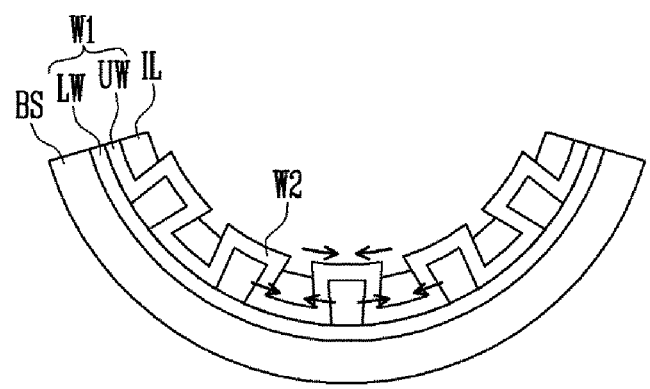
FIG. 6A and FIG. 6B are cross sectional views schematically illustrating a foldable area when a touch panel is folded according to an exemplary embodiment.
Figure 6B:
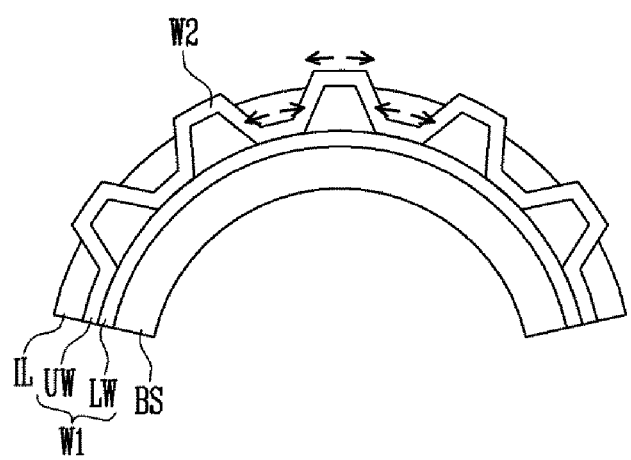

FIG. 6A and FIG. 6B are cross sectional views schematically illustrating a foldable area when a touch panel is folded according to an exemplary embodiment.

Referring to FIG. 6A and FIG. 6B, if the touch panel is folded concavely or convexly in an upper direction of the base substrate BS, stress applied to the second connection wire is dispersed in a direction of the arrow. Accordingly, disconnection of wire which occurs due to stress that is concentrated on the second connection wire when the touch panel is folded may be reduced or prevented. As a result, durability may increase.

Figure 7A:
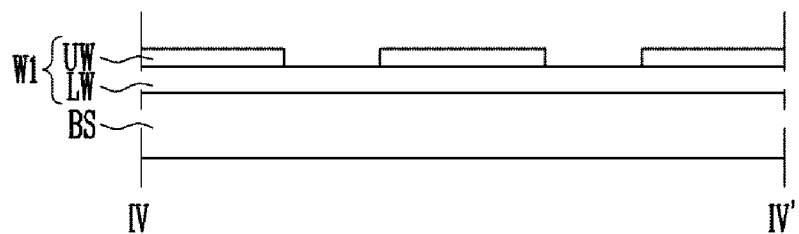
FIG. 7A, FIG. 7B, and FIG. 7C are cross sectional views illustrating a method of manufacturing a wiring part shown in FIG. 5B according to an exemplary embodiment.
Figure 7B:
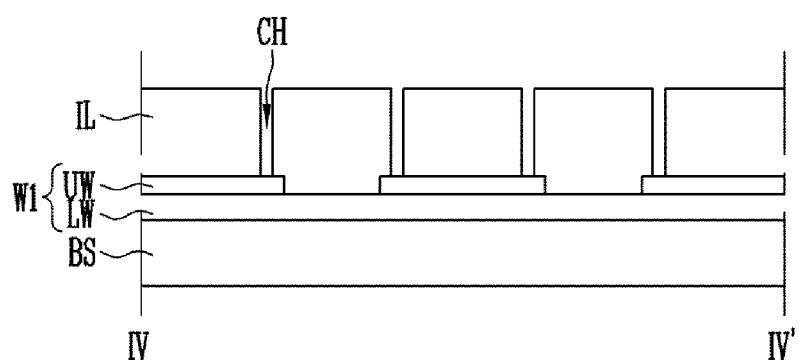
Figure 7C:
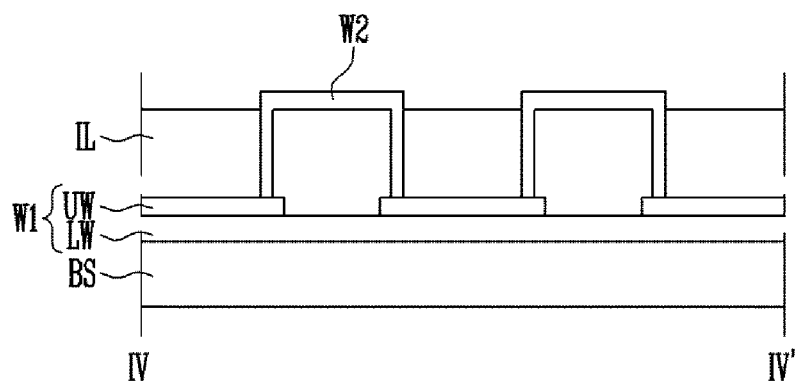

FIG. 7A, FIG. 7B, and FIG. 7C are cross sectional views illustrating a method of manufacturing a wiring part shown in FIG. 5B according to an exemplary embodiment.

Referring to FIG. 7A, a first wire W1 may be formed in the peripheral area of the base substrate BS. The first wire W1 may be formed by forming conductive layers by sequentially stacking material of the lower wire LW and material of the upper wire and patterning the conductive layers. In the peripheral area, a part of the upper layer may be removed such that, for a part of the first wire W1, the upper layer is removed and the lower layer remains. The first wire W1 may be patterned in various methods, for example, but without limitation thereto, patterned using photolithography using a mask.

Although not illustrated, the first block, the first bridge, and the second block disposed in the sensing area may be formed in a single step along with the lower wire LW.

Referring to FIG. 7B, an insulating layer IL may be formed on the base substrate BS where the first wire W1 is formed. The insulating layer IL may be formed by forming organic insulating material or inorganic insulating material on the base substrate BS and on the first wire W1 and patterning it using photolithography and the like. During the patterning, contact holes CH that expose a part of the first wire W1 (particularly, a part of the upper wire UW) may be formed.

Although not illustrated in FIG. 7B, the contact holes that expose part of the top surface of the second block, disposed in the sensing area, may be formed in a single stage along with the contact holes CH that expose a part of the first wire W1.

Referring to FIG. 7C, a second wire W2 may be formed on the base substrate BS where the insulating layer IL is formed. The second wire W2 may be disposed in an area where the upper wire UW is not disposed and may be a bridge that couples the upper wires UW that are adjacent to each other. The second wire W2 may be formed by forming a conductive layer by stacking the second wire W2 material and patterning the conductive layer. The second wire W2 may be patterned in various methods, for example, but without limitation thereto, may be patterned using photolithography that uses a mask.

Although not illustrated, a second bridge disposed in the sensing area may be formed in a single step along with the second wire W2.

As described above, it may be possible to form the wiring part using the step of forming the touch sensing part without additional mask, or even if additional mask is used, the number of masks used is kept at a minimum.

Figure 8:
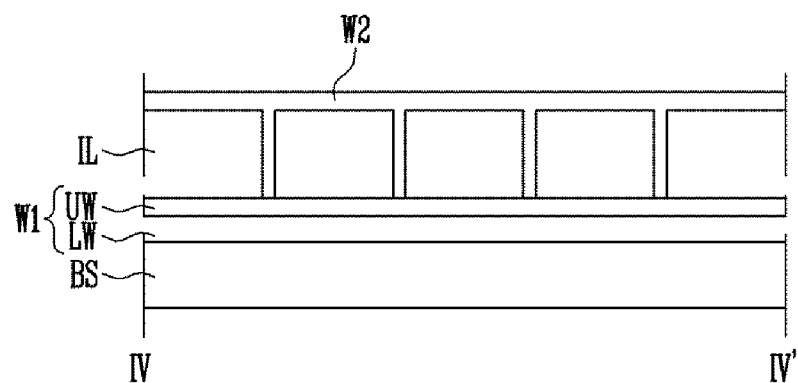
FIG. 8 is a cross sectional view illustrating a wiring part according to an exemplary embodiment.
Figure 9A:
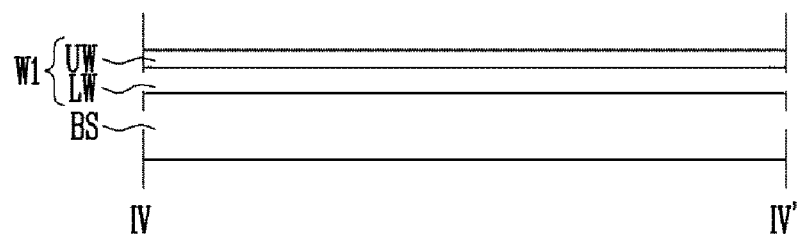
FIG. 9A, FIG. 9B, and FIG. 9C are cross sectional views sequentially illustrating a method of manufacturing the wiring part shown in FIG. 8 according to an exemplary embodiment.
Figure 9B:
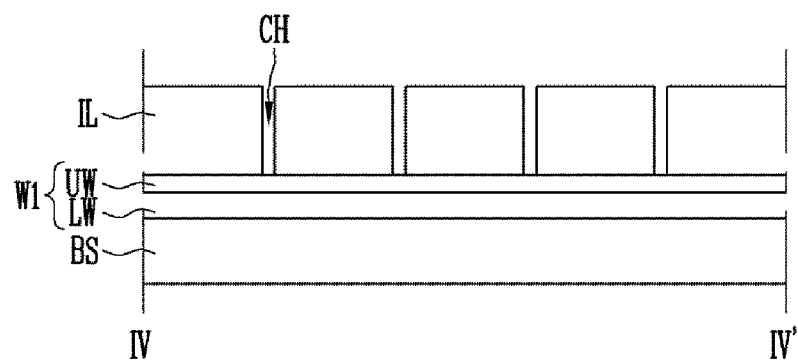
Figure 9C:
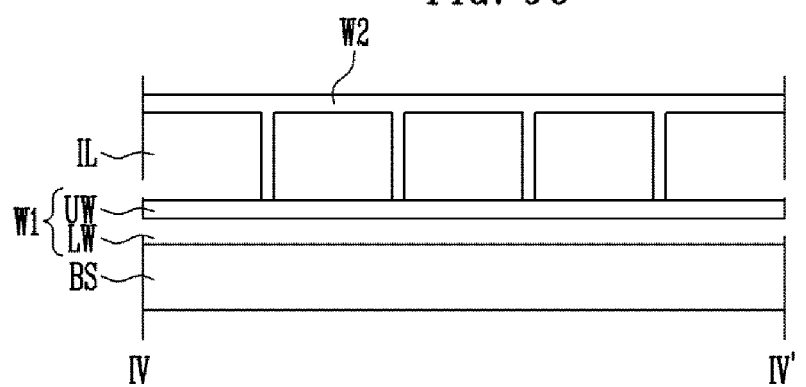

FIG. 8 is a cross sectional view illustrating a wiring part according to an exemplary embodiment. FIG. 8 corresponds to FIG. 5B. FIG. 9A, FIG. 9B, and FIG. 9C are cross sectional views sequentially illustrating a method of manufacturing the wiring part shown in FIG. 8 according to an exemplary embodiment.

Hereinafter, in order to avoid repetitive description, differences in other exemplary embodiments from the exemplary embodiments already illustrated above will be mainly described. Any features not described below are may be the same or similar to those described in the exemplary embodiments already illustrated above. Same reference numerals refer to the same elements, and similar reference numerals refer to similar elements.

Referring to FIG. 8, FIG. 9A, FIG. 9B, and FIG. 9C, a first wire W1 may be disposed on a base substrate BS. The first wire W1 may include a lower wire LW and an upper wire UW sequentially stacked on the base substrate BS. The upper wire UW may be formed by completely overlapping the lower wire LW when viewed from a plane view. The upper wire UW may completely overlap the lower wire LW in both the rigid area and the foldable area when viewed from a plane view.

The insulating layer IL may be disposed on the base substrate BS where the first wire W1 is formed. Contact holes CH that expose a part of the first wire W1 may be disposed on the insulating layer IL and the first wire W1.

The second wire W2 may be disposed on the insulating layer IL. The second wire W2 may completely overlap the first wire W1 when viewed from a plane view. The second wire W2 may contact the first wire W1 through the contact holes CH and may electrically couple the first wires W1 that are adjacent to each other.

The second wire W2 may be formed of the same metal as the upper wire UW of the first wire W1 but may be formed of a different metal as well. For example, but without limitation thereto, if the upper wire UW of the first wire W1 is made of copper, the second wire W2 may be made of copper as well. Or, if the upper wire UW of the first wire W1 is formed of copper, the second wire W2 may be formed of another metal, for example but without limitation thereto, aluminum.

In the above described structure, stress applied to the entire first connection wire may be dispersed in a direction of the arrow due to the structure in which the contact holes CH are coupled even when the touch panel is folded in a direction of the upper part of the base substrate BS in a concave or convex manner. Also, even if disconnection occurs at a part of the first wire W1 or the second wire W2 in the foldable area, since signal transfer path may be secured by the remaining parts, signal may be safely transferred. As a result, durability of the touch panel may increase.

Figure 10:
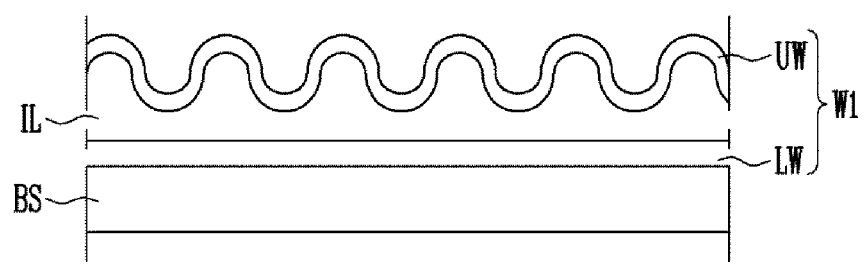
FIG. 10 is a cross sectional view illustrating a wiring part according to an exemplary embodiment.
Figure 11A:
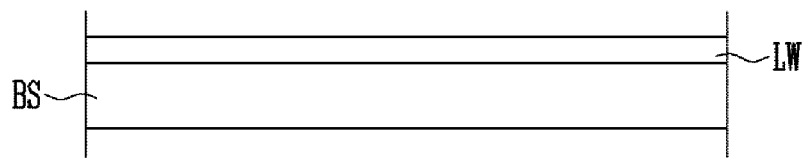
FIG. 11A, FIG. 11B, and FIG. 11C are cross sectional views sequentially illustrating a method of manufacturing the wiring part shown in FIG. 10 according to an exemplary embodiment.
Figure 11B:
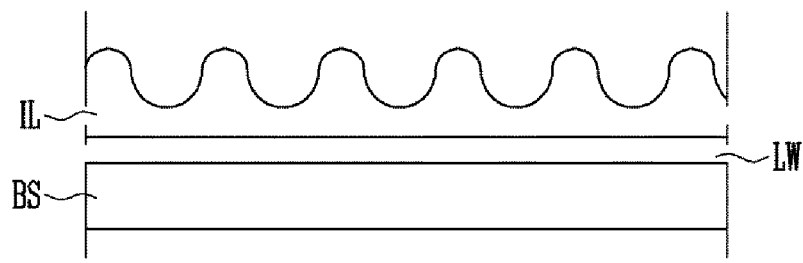
Figure 11C:
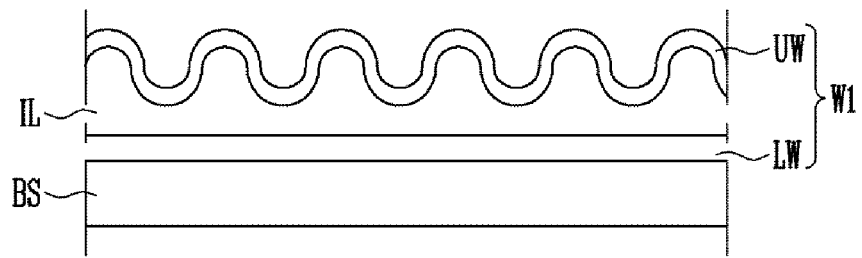

FIG. 10 is a cross sectional view illustrating a wiring part according to an exemplary embodiment. FIG. 10 corresponds to FIG. 5B. FIG. 11A, FIG. 11B, and FIG. 11C are cross sectional views sequentially illustrating a method of manufacturing the wiring part shown in FIG. 10 according to an exemplary embodiment.

Referring to FIG. 10, FIG. 11A, FIG. 11B, and FIG. 11C, a lower wire LW may be disposed on a base substrate BS. The lower wire LW may include or may be formed of a transparent conductive material.

An insulating layer IL may be disposed on the base substrate BS where the lower wire LW is formed. The insulating layer IL may have corrugation on a top surface. The corrugation may extend in a direction parallel to the folding line FL when the touch panel is folded. For example, but without limitation thereto, protrusions projected towards the upper part may extend in a direction parallel to the folding line on the top surface of the insulating layer IL.

The corrugation of the upper part of the insulating layer IL may be formed in various methods, for example, but without limitation thereto, in a method using photolithography using a half-tone mask.

The upper wire may be formed on the insulating layer. The upper wire UW may include or may be formed of a metal. The upper wire UW may be formed by completely overlapping the lower wire LW when viewed from a plane view. The upper wire UW may completely overlap the lower wire in all of the rigid areas and the foldable areas from a plane view.

In the above structure, the upper wire UW of the first wire W1 may bend multiple times such that it may have a preset angle on the top surface of the base substrate BS. Even when the touch panel is folded, stress applied to the wire is dispersed. Therefore, disconnection may be reduced or prevented. As a result, durability of the touch panel may increase.

In an exemplary embodiment, the structure for dispersing stress applied to each wire is not limited to the wiring part only, but it may also apply to touch sensing part.

Figure 12A:
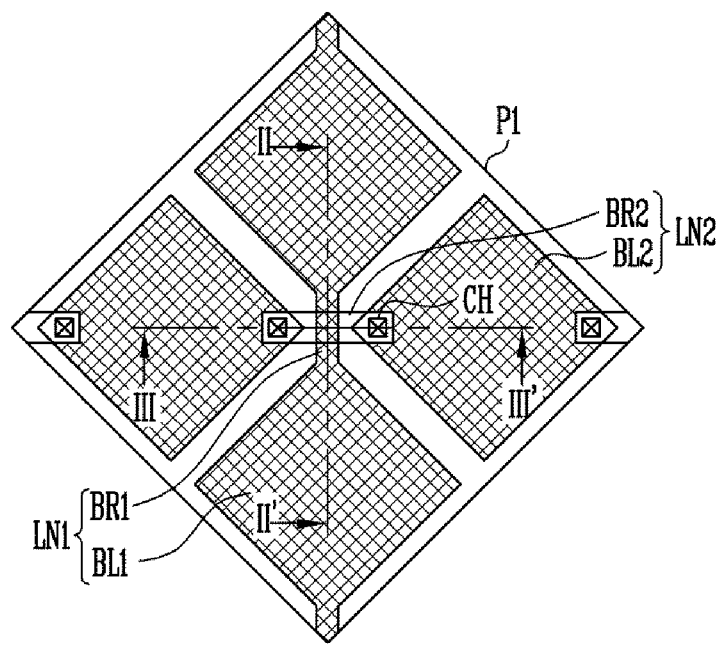
FIG. 12A is a plane view illustrating a touch sensing unit corresponding to area P1 in FIG. 3 in a touch panel according to an exemplary embodiment.
Figure 12B:
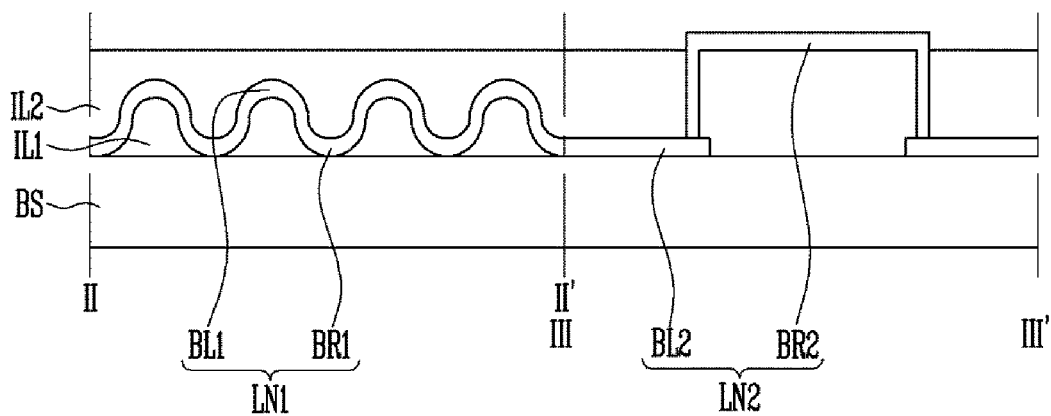
FIG. 12B is a cross sectional view taken along section lines II-II' and III-III' in FIG. 12A according to an exemplary embodiment.

FIG. 12A is a plane view illustrating a touch sensing unit corresponding to area P1 in FIG. 3 in a touch panel according to an exemplary embodiment. FIG. 12B is a cross sectional view taken along section lines II-II' and III-III' in FIG. 12A according to an exemplary embodiment.

Referring to FIG. 12A and FIG. 12B, a first insulating layer IL1 may be disposed on a base substrate BS.

The first insulating layer IL1 may have corrugation on its top surface in the foldable area. In a rigid area which is not the foldable area, the first insulating layer IL1 may not be provided, or, even if the first insulating layer IL1 is provided, it may not have corrugation on the top surface.

Figure 13:
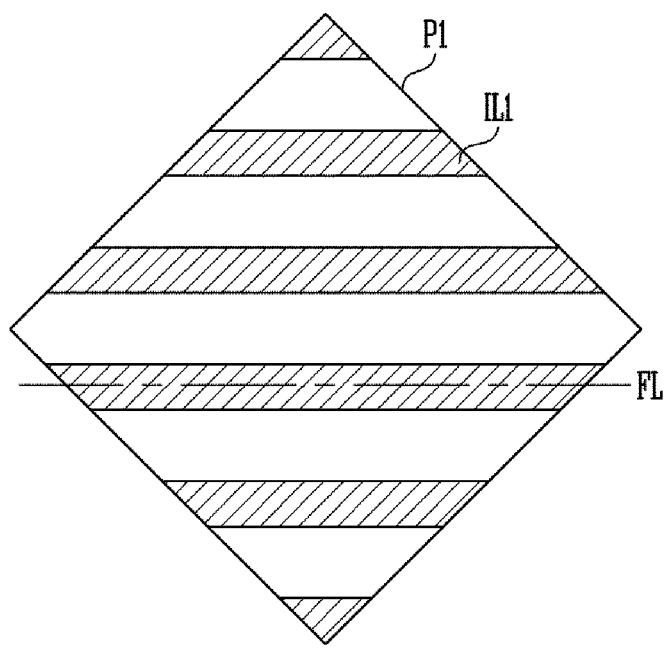
FIG. 13 is a plane view illustrating protrusions of a first insulating layer in an area corresponding to area P1 in FIG. 3 according to an exemplary embodiment.

FIG. 13 is a plane view illustrating protrusions of a first insulating layer in an area corresponding to area P1 in FIG. 3 according to an exemplary embodiment. The area P1 may be the corrugation of the first insulating layer IL1 in FIG. 13. Protrusions are represented by deviant crease lines, a hatch pattern, and dent portion is depicted without deviant crease lines. Other components are omitted for conciseness.

Referring to FIG. 13, the corrugation may extend in a direction parallel to a folding line FL when the touch panel is folded. For example, but without limitation thereto, the protrusions protruding towards the upper part from the top surface of the first insulating layer IL1 may extend in a direction parallel to the folding line FL. The corrugations of the upper part of the first insulating layer IL1 may be formed using various methods, for example, but without limitation thereto, using photolithography using a half-tone mask.

The first insulating layer IL1 may be an organic insulating layer or an inorganic insulating layer. As for a material of the organic insulating layer, an organic insulating material such as a polyacrylic compound, a polyimide compound, a fluorinated carbon compound such as Teflon® and a benzocyclobutene compound may be used. As for a material of the inorganic insulating layer, an inorganic insulating material such as polysiloxane, silicon nitride, and silicon oxide may be used.

Referring to FIG. 12A and FIG. 12B, the first block BL1, the first bridge BR1, and the second block BL2 may be disposed on the first insulating layer IL1. The first block BL1, the first bridge BR1, and the second block BL2 may have a mesh pattern. Regarding a material forming the first block BL1, the first bridge BR1, and the second block BL2 may be at least one of metals such as gold (Au), silver (Ag), aluminum (Al), molybdenum (Mo), chrome (Cr), titanium (Ti), nickel (Ni), neodymium (Nd), copper (Cu), or an alloy of the metals.

A second insulating layer IL2 may be disposed on the base substrate BS where the first block BL1, the first bridge BR1, and the second block BL2 are formed.

The second insulating layer IL2 may be an organic insulating layer or an inorganic insulating layer. As for a material of the organic insulating layer, an organic insulating material such as a polyacrylic compound, a polyimide compound, a fluorinated carbon compound such as Teflon® and a benzocyclobutene compound may be used. As for a material of the inorganic insulating layer, an inorganic insulating material such as polysiloxane, silicon nitride, and silicon oxide may be used.

Contact holes CH which expose part of the second block BL2 may be disposed on the second insulating layer IL2.

The second bridge BR2 may be disposed on the second insulating layer IL2. The second bridge BR2 may contact the second blocks BL2 through the contact holes CH and may electrically couple the second blocks BL2 that are adjacent to each other.

The second bridge BR2 may include or may be formed of a metal. For example, but without limitation thereto, the second bridge BR2 may include or may be made of at least one of metals such as gold (Au), silver (Ag), aluminum (Al), molybdenum (Mo), chrome (Cr), titanium (Ti), nickel (Ni), neodymium (Nd) and copper (Cu), or an alloy of the metals.

The second bridge BR2 may be formed of a single layer, but it is not limited thereto, and the second bridge BR2 may be formed of the metals and have multi-layers with at least two stacked materials from the alloys.

In an exemplary embodiment, even though a first sensing line LN1 and a second sensing line LN2 may be formed of a metal, stress that is applied may be dispersed as the first sensing line LN1 and the second sensing line LN2 bend obliquely such that the lines form a preset angle with respect to the top surface of the base substrate BS, and as a result, disconnection may be prevented. Consequently, durability of the touch panel may increase.

Figure 14:
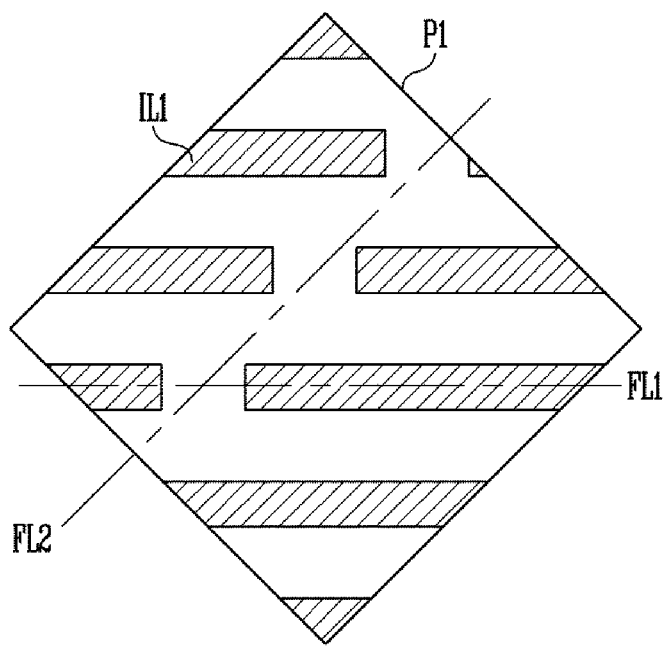
FIG. 14 is a plane view illustrating protrusions of a first insulating layer in an area corresponding to area P1 in FIG. 3 according to an exemplary embodiment.

A shape of the corrugation of the first insulating layer IL1 may change in various manners. FIG. 14 is a plane view illustrating protrusions of a first insulating layer in an area corresponding to area P1 in FIG. 3 according to an exemplary embodiment. In FIG. 14, protrusions are represented by deviant crease lines, and dent portion is depicted without deviant crease lines. Other components are omitted for a concise illustration.

Referring to FIG. 14, there may be two folding lines. One of the folding lines may be called a first folding line FL1, and the other may be called a second folding line FL2. The corrugation may extend in a direction parallel to one of the first and second folding lines FL1 and FL2. Furthermore, protrusions or dent portion may be provided along the remaining one of the folding lines. Protrusions and dent portion may be arranged in a various combination along the plurality of folding lines.

Accordingly, even when the folding lines are provided in the touch panel, disconnection of wires may be reduced. As a result, durability of the touch panel may increase.

Figure 15A:
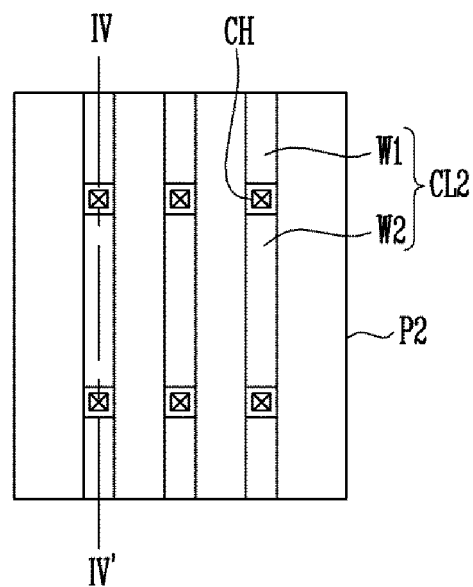
FIG. 15A is a plane view showing an enlarged view of area P2 illustrated in FIG. 3 according to an exemplary embodiment.
Figure 15B:
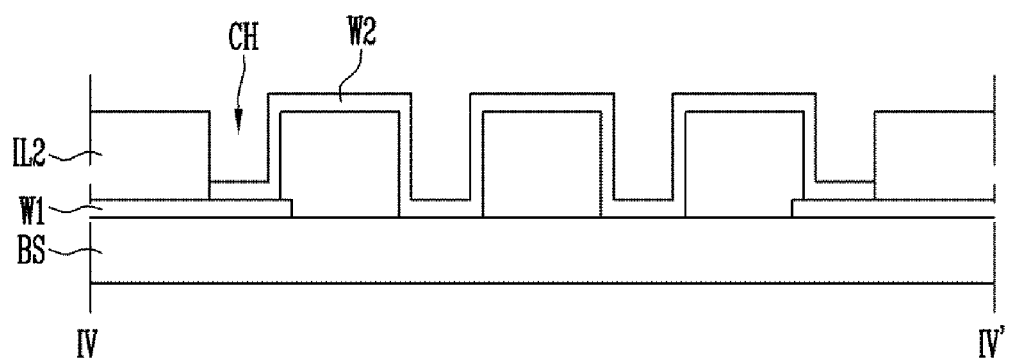
FIG. 15B is a cross sectional view, taken along section line IV-IV' in FIG. 15A, of a touch panel according to an exemplary embodiment.

FIG. 15A is a plane view showing an enlarged view of P2 illustrated in FIG. 3 according to an exemplary embodiment, and FIG. 15B is a cross sectional view, taken along IV-IV' in FIG. 15A, of a touch panel according to an exemplary embodiment.

Referring to FIG. 15A and FIG. 15B, in a touch panel according to an exemplary embodiment, a second connection wire CL2 of a wiring part may include a first wire W1 and a second wire W2 in a foldable area. In the wiring part, the first insulating layer IL1 may not be provided in the foldable area. The first wire W1 may be disposed on the base substrate BS and the first wire W1 may be formed of the same material and using the same stage as the first block BL1, the first bridge BR1, and the second block BL2 shown in FIG. 12A and FIG. 12B. A part of the first wire W1 may be removed in an area corresponding to the foldable area. A second insulating layer IL2 may be disposed in an area where the first wire W1 is removed. The second insulating layer IL2 may have a corrugation extending in a direction parallel to the folding line, similar to the touch sensing part. The second wire W2 may be disposed on the second insulating layer IL2 and the second wire W2 may bend according to the corrugation of the second insulating layer IL2. The bending of the second wire W2 may be change in a various ways by forming the second insulating layer IL2 in different shapes. The second wire W2 may be disposed corresponding to an area from where the first wire W1 is removed and may be directly coupled to the first wire W1 by, from a plane view, both ends overlapping the first wire W1.

Consequently, stress that is applied may be dispersed by the second wire W2 bending as it forms a preset angle with respect to the top surface of the base substrate BS, and as a result, disconnection may be reduced or prevented. Consequently, durability of the touch panel may increase.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch panel comprising:
a base substrate comprising a first rigid area, a flexible area, and a second rigid area, wherein the first rigid area, the flexible area, and the second rigid area are sequentially disposed in a first direction;
an insulating layer disposed on the base substrate, wherein, in the flexible area, the insulating layer comprises patterned parts and non-patterned parts;
a wiring part extending across the first rigid area, the flexible area, and the second rigid area in a peripheral region of the base substrate, wherein, in the flexible area, the wiring part comprises a first wire covering the base substrate and a second wire covering the patterned parts and the non-patterned parts;
a touch sensing part disposed in a sensing region of the base substrate, wherein the peripheral region is disposed outside the sensing region; and
a pad disposed in the second rigid area of the peripheral region, wherein the wiring part connects the pad and the touch sensing part,
wherein the first wire comprises a lower wire and an upper wire sequentially disposed on the base substrate, the lower wire extending across the first rigid area, the flexible area, and the second rigid area,
wherein the lower wire comprises a transparent conductive material and the upper wire comprises a metal, and
wherein the first wire is sequentially covered by the insulating layer and the second wire.

2. The touch panel as claimed in claim 1, wherein:
the insulating layer comprises contact holes exposing parts of the first wire; and
the second wire is coupled to the first wire through the contact holes.

3. The touch panel as claimed in claim 2, wherein the touch sensing part comprises:
first sensing lines extending in the first direction; and
second sensing lines capacitively coupling with the first sensing lines and extending in a second direction different from the first direction.

4. The touch panel as claimed in claim 3, wherein:
each of the first sensing lines comprises:
first blocks arranged in the first direction; and
first bridges each coupling two adjacent ones of the first blocks; and
each of the second sensing lines comprises:
second blocks arranged in the second direction; and
second bridges each coupling two adjacent ones of the second blocks.

5. The touch panel as claimed in claim 4, wherein the first blocks, the first bridges, the second blocks, and the lower wire are made of a same material.

6. The touch panel as claimed in claim 4, wherein the first blocks, the first bridges, the second blocks, and the lower wire comprise a transparent conductive material.

7. The touch panel as claimed in claim 4, wherein the upper wire, the second bridges, and the second wire comprise a metal.

8. The touch panel as claimed in claim 7, wherein the upper wire comprises a different metal than the second bridges and the second wire.

9. The touch panel as claimed in claim 4, wherein the first wire, the first blocks, the second blocks, and the first bridges comprise a metal.

10. The touch panel as claimed in claim 9, wherein the first blocks and the second blocks have metal mesh patterns.

11. The touch panel as claimed in claim 10, wherein the insulating layer comprises protrusions on a top surface in the flexible area, the protrusions protruding in a direction parallel to a folding line along which the flexible area is configured to fold.

12. The touch panel as claimed in claim 11, wherein the insulating layer comprises a dent portion, the dent portion being dented towards a direction parallel to the folding line.

13. The touch panel as claimed in claim 12, wherein the flexible area is associated with a plurality of folding lines, the plurality of folding lines extending in different directions.

14. The touch screen display panel as claimed in claim 1, wherein:
the lower wire comprises at least one of silver nanowire, indium tin oxide (ITO), indium zinc oxide (IZO), antimony zinc oxide (AZO), indium tin zinc oxide (ITZO), zinc oxide (ZnO), tin oxide (SnO2), carbon nano tube, and graphene; and
the upper wire comprises at least one of gold (Au), silver (Ag), aluminum (Al), molybdenum (Mo), chrome (Cr), titanium (Ti), nickel (Ni), neodymium (Nd), and copper (Cu), or an alloy comprising at least one of gold (Au), silver (Ag), aluminum (Al), molybdenum (Mo), chrome (Cr), titanium (Ti), nickel (Ni), neodymium (Nd), and copper (Cu).

15. The touch panel as claimed in claim 1, wherein the upper wire is partially removed in an area corresponding to an area to which the second wire is disposed.

16. The touch panel as claimed in claim 1, wherein the second wire overlaps the first wire.

17. A display device comprising:
a display panel; and
a touch panel disposed on a front surface of the display panel,
wherein the touch panel comprises:
a base substrate comprising a first rigid area, a flexible area, and a second rigid area, wherein the first rigid area, the flexible area, and the second rigid area are sequentially disposed in a first direction;
an insulating layer disposed on the base substrate, wherein, in the flexible area,
the insulating layer comprises patterned parts and non-patterned parts;
a wiring part extending across the first rigid area, the flexible area, and the second rigid area in a peripheral region of the base substrate, wherein, in the flexible area, the wiring part comprises a first wire covering the base substrate and a second wire covering the patterned parts and the non-patterned parts;
a touch sensing part disposed in a sensing region of the base substrate, wherein the peripheral region is disposed outside the sensing region; and
a pad disposed in the second rigid area of the peripheral region, wherein the wiring part connects the pad and the touch sensing part,
wherein the first wire comprises a lower wire and an upper wire sequentially disposed on the base substrate, the lower wire extending across the first rigid area, the flexible area, and the second rigid area, wherein the lower wire comprises a transparent conductive material and the upper wire comprises a metal, and wherein the first wire is sequentially covered by the insulating layer and the second wire.

18. The display device as claimed in claim 17, wherein:

the insulating layer comprises contact holes exposing parts of the first wire; and the second wire is coupled to the first wire through the contact holes.

19. The display device as claimed in claim 18, wherein the touch sensing part comprises:

first sensing lines extending in the first direction; and second sensing lines capacitively coupling with the first sensing lines and extending in a second direction different from the first direction.

* * * * *